United States Patent
Gupta

(10) Patent No.: US 8,233,418 B2
(45) Date of Patent: Jul. 31, 2012

(54) MOBILE STATION AND METHOD FOR DYNAMICALLY SWITCHING SLEEP CYCLES WITHOUT DEACTIVATING A CURRENT POWER SAVINGS CLASS (PSC)

(75) Inventor: Maruti Gupta, Portland, OR (US)

(73) Assignee: Intel Corporation, Santa Carla, CA (US)

( * ) Notice: Subject to any disclaimer, the term of this patent is extended or adjusted under 35 U.S.C. 154(b) by 492 days.

(21) Appl. No.: 12/497,196

(22) Filed: Jul. 2, 2009

(65) Prior Publication Data

US 2010/0002615 A1      Jan. 7, 2010

Related U.S. Application Data

(60) Provisional application No. 61/134,188, filed on Jul. 7, 2008.

(51) Int. Cl.
*G08C 17/00* (2006.01)

(52) U.S. Cl. ........................................ 370/311

(58) Field of Classification Search .................. 370/311, 370/343, 350, 313, 328, 329; 455/343, 522, 455/507, 517, 574, 553
See application file for complete search history.

(56) References Cited

U.S. PATENT DOCUMENTS 6,480,476 B1 *  11/2002  Willars .......................... 370/311

* cited by examiner

*Primary Examiner* — Chi Pham
*Assistant Examiner* — Alexander Boakye
(74) *Attorney, Agent, or Firm* — Schwegman, Lundberg & Woessner, P.A.; Gregory J. Gorrie

(57) ABSTRACT

Embodiments of a mobile station and method for dynamically changing a sleep cycle are generally described herein. The mobile station is configured to dynamically switch a sleep cycle without deactivating a current power savings class (PSC). In some embodiments, the mobile station may generate a dynamic sleep-cycle switching message to request a change in the sleep cycle of the mobile station when changes in downlink traffic are detected. The dynamic sleep-cycle switching message may indicate either one of a plurality of predefined sleep cycles or may indicate parameters defining a new sleep cycle. This may allow the sleep cycle of the currently active PSC to be changed without deactivation.

19 Claims, 3 Drawing Sheets

BROADBAND WIRELESS ACCESS NETWORK

MOBILE STATION AND METHOD FOR DYNAMICALLY SWITCHING SLEEP CYCLES WITHOUT DEACTIVATING A CURRENT POWER SAVINGS CLASS (PSC)

RELATED APPLICATIONS

This application claims the benefit of priority under 35 U.S.C. 119(e) to U.S. Provisional Patent Application Ser. No. 61/134,188, filed Jul. 7, 2008, which is incorporated herein by reference in its entirety.

TECHNICAL FIELD

Embodiments pertain to wireless communications. Some embodiments pertain to power management in mobile stations. Some embodiments pertain to dynamically changing sleep cycles of mobile stations. Some embodiments pertain to Worldwide Interoperability for Microwave Access (WiMAX) networks and mobile stations configured to operate in accordance with one of the IEEE 802.16 standards.

BACKGROUND

Some conventional wireless networks utilize a sleep mode to reduce the power consumption of mobile stations and decrease usage of serving base station's air interface resources. In WiMAX networks for example, for each involved mobile station, the serving base station may maintain one or more contexts related to predefined power savings classes (PSCs). A PSC is a group of connections that have common demand properties. PSCs may differ by their parameter sets, procedures of activation/deactivation, and policies of mobile station availability for data transmission.

In current WiMAX networks, to change a PSC (e.g. a PSC of Type II) a mobile station first sends a Mob-SLP-REQ message to de-activate the currently active PSC and then sends another Mob-SLP-REQ message to active another PSC. This message exchange is costly both in terms of the signaling overhead as well as the latency to implement the change. As a result, sleep mode operation in accordance with the current IEEE 802.16 standards fails to take full advantage of changes in traffic activity in an efficient manner.

Thus, what is needed is a mobile station and method for sleep mode operation with reduced signaling overhead and reduced latency. What is also needed is need is a mobile station and method for sleep mode operation that is more responsive to changes in traffic activity resulting in reduced power consumption.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
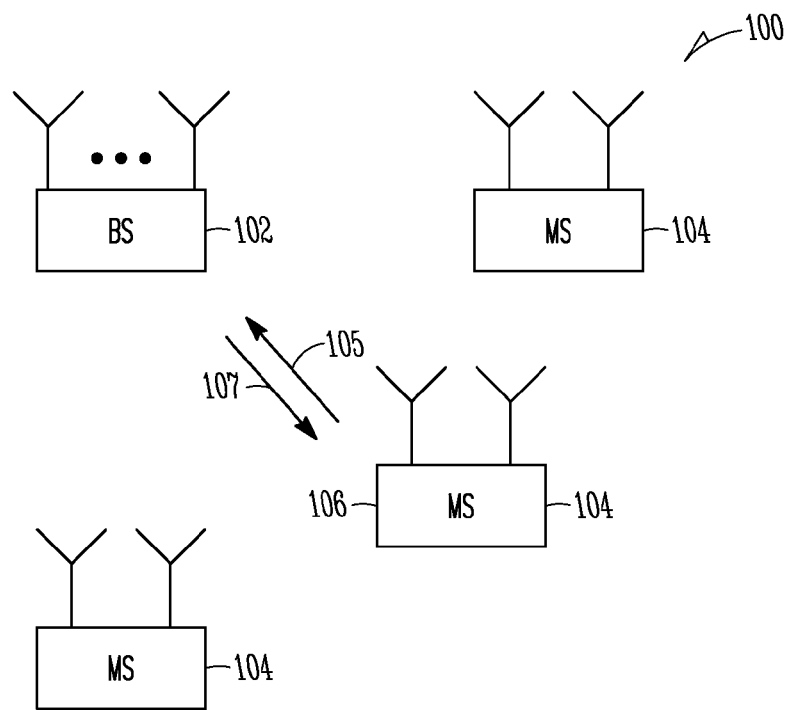
FIG. 1 is a wireless network in accordance with some embodiments.

FIG. 1 is a wireless network in accordance with some embodiments. Wireless network 100 may include a base station 102 and one or more mobile stations 104. Mobile stations 104 may include both fixed and mobile subscriber stations. In some embodiments, wireless network 100 may be a broadband wireless access network, such as a WiMAX network operating in accordance one of the 802.16 standards. In accordance with embodiments, base station 102 and/or any one or more of mobile stations 104 are configured to dynamically switch sleep cycles without deactivating a current power savings class (PSC).

In accordance with embodiments, a mobile station 104, such as mobile station 106, may generate a dynamic sleep-cycle switching message 105 to request a change in the sleep cycle of the mobile station 106. The dynamic sleep-cycle switching message 105 may indicate either one of a plurality of predefined sleep cycles or may indicate parameters defining a new sleep cycle. In these embodiments, the sleep cycle may be changed without deactivating a currently active PSC.

The mobile station 106 may observe and evaluate the downlink traffic 107 to detect changes in the downlink traffic pattern. The mobile station 106 may select either one of the predefined sleep cycles or the parameters defining the new sleep cycle based on detected changes in the downlink traffic 107. In these embodiments, the mobile station 106 may observe and evaluate downlink traffic 107 during listen windows of the currently active sleep cycle.

In response to detection of changes in the downlink traffic 107, the mobile station 106 may configure the dynamic sleep-cycle switching message 105 to change the sleep cycle of the currently active PSC without deactivating the currently active PSC. The sleep cycle may be changed by changing parameters (i.e., a duty cycle) of the currently active PSC.

In some embodiments, the PSC may be associated with one or more connection identifiers (CIDs) and may define a sleep cycle. A sleep cycle may comprise a sleep window during which the base station 102 does not transmit any traffic to the mobile station 106 for any of the CIDs associated with that PSC. The sleep cycle also comprises a listen window during which the base station 102 may receive and/or transmit data or control messages to the mobile station 106. The sleep window may be referred to as an unavailability interval (UAI) and the listen window may be referred to as an availability interval (AI). In some embodiments, the mobile station 106 may change the sleep cycle of the currently active PSC by changing a length of duty cycle of AIs and UAIs of the sleep cycle of the currently active PSC.

In some embodiments, the dynamic sleep-cycle switching message 105 instructs the serving base station 102 to change the sleep cycle of a currently active PSC of the mobile station 106. The dynamic sleep-cycle switching message 105 may include an indicator to indicate one of the predefined sleep cycles in which each of the predefined sleep cycles has a predetermined duty cycle. Alternatively, the dynamic sleep-cycle switching message 105 may indicate parameters defining the duty cycle of new sleep cycle.

In some embodiments, the mobile station 106 may be configured to determine when a particular service class is active. The dynamic sleep-cycle switching message 105 may be generated to request a change in the sleep cycle based on the active service class.

In some alternate embodiments, both the mobile station 106 and the base station 102 are configured to observe the downlink traffic 107 during a predetermined number of frames. In these alternate embodiments, both the mobile station 106 and the base station 102 are configured to change the sleep cycle to one of the predefined sleep cycles without the use of the dynamic sleep-cycle switching message 105 based on the observed downlink traffic. In these alternate embodiments, the sleep-cycle can be implicitly changed without the use of an explicit signaling message, such as the dynamic sleep-cycle switching message 105.

In some embodiments, base station 102 and mobile stations 104 may be configured to communicate using orthogonal frequency division multiplexed (OFDM) communication signals over a multicarrier communication channel. The OFDM signals may comprise a plurality of orthogonal subcarriers. In some broadband multicarrier embodiments, base stations 102 and mobile stations 104 may be configured to communicate in accordance with an orthogonal frequency division multiple access (OFDMA) technique. In some embodiments, base station 102 and mobile stations 104 may be configured to receive signals in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. In some embodiments, mobile stations 104 may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some IEEE 802.16 embodiments, the mobile station 106 may be configured to operate in a WiMAX network operating in accordance one of the IEEE 802.16 standards or proposed standards (i.e., IEEE 802.16m). In these embodiments, the mobile station 106 may observe the downlink traffic 107 during a predetermined number of frames. The frames may correspond to WiMAX downlink subframes. The mobile station 106 and the base station 102 may communicate the downlink subframes and uplink subframes using an OFDMA communication technique.

Base station 102 and mobile stations 104 may use one or more antennas for communication. The antennas may comprise directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, two or more antennas may be used and may be effectively separated to take advantage of spatial diversity and the different spatial channel characteristics that may result between each of the antennas and the antennas of a single device.

Figure 2:
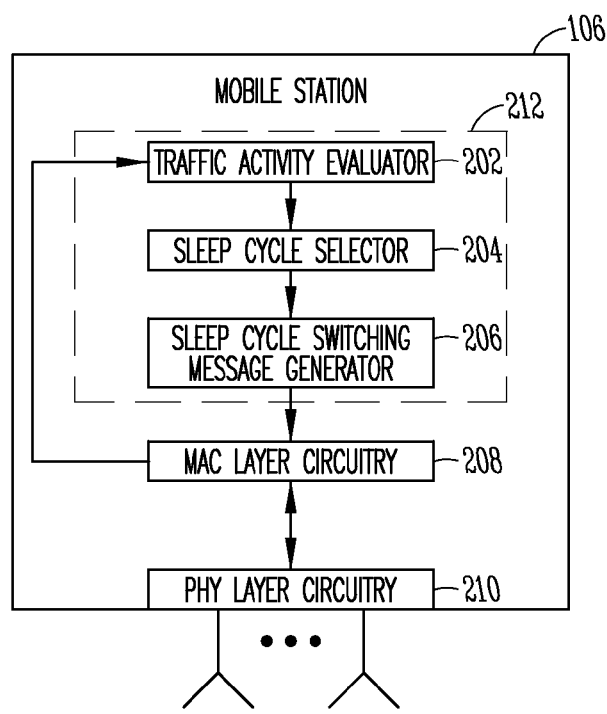
FIG. 2 is a block diagram of a mobile station in accordance with some embodiments.

FIG. 2 is a block diagram of a mobile station in accordance with some embodiments. The mobile station 106 may be suitable for use as the mobile station 106 (FIG. 1) as well as any one or more of mobile stations 104 (FIG. 1), although other configurations may also be suitable. The mobile station 106 may include, among other things, processing circuitry 212, media-access control (MAC) layer circuitry 208, and physical (PHY) layer circuitry 210. The processing circuitry 212 may include a traffic activity evaluator 202 configured to observe and evaluate the downlink traffic 107 (FIG. 1) to detect changes in the downlink traffic pattern. The processing circuitry 212 may also include a sleep cycle selector 204 configured to select either one of the predefined sleep cycles or the parameters defining the new sleep cycle based on detected changes in the downlink traffic 107. The processing circuitry 212 may also include a sleep cycle message generator 206 to generate the dynamic sleep-cycle switching message 105 (FIG. 1). MAC layer circuitry 208 may perform MAC layer operations for accessing the wireless medium, and PHY layer circuitry 210 may include elements for transmitting and receiving signals through the wireless medium for communications with the base station 102 (FIG. 1). PHY layer circuitry 210 may be configured to transmit the dynamic sleep-cycle switching message 105 to the base station 102. Processing circuitry 211 may also include circuitry (not separately illustrated) to enter a sleep mode and awake from the sleep mode in accordance with the parameters of the current sleep cycle as described herein.

In some embodiments, in response to detection of changes in the downlink traffic 107, the processing circuitry 212 may be configured to refrain from sending a request message to a serving base station 102 to deactivate the currently active PSC in response to changes detected in the downlink traffic. The processing circuitry 212 may also be configured to refrain from sending another request message to the serving base station 102 to activate a different (e.g., a new or previously defined) PSC. In some of these embodiments, the mobile station 106 may refrain from sending a Mob-SLP-REQ message to the base station 102 to deactivate the currently active PSC. The mobile station 106 may also refrain from sending another Mob-SLP-REQ message to activate a new or previously defined PSC. In a conventional WiMAX network, a conventional WiMAX mobile station sends a Mob-SLP-REQ message to a WiMAX base station to deactivate its currently active PSC, and then sends another Mob-SLP-REQ message to activate a new or previously defined PSC. This conventional process is costly both in terms of the signaling overhead as well as the latency to implement the change.

In some embodiments, the dynamic sleep-cycle switching message 105 may include an identifier having a predetermined number of bits indicating one of the predefined sleep cycles. The identifier may be a three-bit identifier, although the scope of the embodiments is not limited in this respect.

Table I illustrates some examples of predefined sleep cycles in accordance with some embodiments.

TABLE I

Predefined Sleep Cycles

| Sleep Cycle ID | Type | Description | Usage Examples |
|---|---|---|---|
| 000 | Fixed | shorter AI, shorter UAI | talk periods of VoIP traffic |
| 001 | Fixed | shorter AI, longer UAI | mutual silence periods of the VoIP traffic, constant periodic background traffic (e.g., instant messaging (IM) updates or email) |
| 010 | Fixed | longer AI, longer UAI | delay-tolerant traffic (e.g., FTP and HTTP traffic) |
| 011 | Binary | shorter AI, | on-periods of delay- |

TABLE I-continued

Predefined Sleep Cycles

| Sleep Cycle ID | Type | Description | Usage Examples |
|---|---|---|---|
| | Exponential | shorter UAI, shorter final UAI | tolerant traffic |
| 100 | Binary Exponential | shorter AI, longer UAI, longer final UAI | off-periods of delay-tolerant traffic |

As described in Table I, a sleep cycle may comprise one or more availability intervals (AI) interleaved with one or more unavailability intervals (UAI). The predefined sleep cycles may include, for example, a first fixed sleep cycle with a shorter AI and a shorter UAI, a second fixed sleep cycle with a shorter AI and a longer UAI, and a third fixed sleep cycle with a longer AI and a longer UAI. The predefined sleep cycles may also include, for example, a first binary exponential sleep cycle with a shorter AI, a shorter UAI and a shorter final UAI, and a second binary exponential sleep cycle with a shorter AI, a longer UAI and a longer final UAI. In these embodiments, the shorter AI may range from two to ten frames, and the longer AI may be greater than eight frames, although the scope of the embodiments is not limited in this respect.

The binary exponential sleep cycles may be defined by fixed AI (listed first in Table I), an initial UAI (listed next in Table I) and a final UAI (listed last in Table I). The UAI is increased in a binary exponential manner (e.g., doubles) from the initial to the final UAI and may then remain constant. In some embodiments, the binary exponential sleep cycles may operate in accordance with the IEEE 802.16(e)-2005 wireless communication standard, although this is not a requirement.

As also described in Table I, the first fixed sleep cycle may be indicated by a first identifier (e.g., '000'), the second fixed sleep cycle may be indicated by a second identifier (e.g., '001'), the third fixed sleep cycle may be indicated by a third identifier (e.g., '010'), the first binary exponential sleep cycle may be indicated by a fourth identifier (e.g., '011'), and the second binary exponential sleep cycle may be indicated by a fifth identifier (e.g., '100'). Although only five predetermined sleep cycles are described herein, embodiments are applicable to the inclusion of a fewer or a greater number of predetermined sleep cycles. The use of a three-bit identifier, for example, may allow up to eight predetermined sleep cycles to be defined. In some alternate embodiments, identifiers with two or four bits may be used depending on the number of predetermined sleep cycles that are defined.

In some embodiments, the first fixed sleep cycle may be selected during talk periods of voice-over-internet-protocol (VoIP) traffic and the second fixed sleep cycle may be selected during mutual silence periods of the VoIP traffic. In these embodiments, when the mobile station 106 detects changes in traffic corresponding to talk periods and changes in the traffic corresponding to mutual silence periods, the mobile station 106 is configured to generate and send a dynamic sleep-cycle switching message 105 to change the parameters of the currently active PSC. The reduced signaling overhead and reduced latency allows the mobile station 106 to dynamically respond to changes in traffic activity so that the sleep cycle better reflects current traffic activity. This may result in reduced power consumption.

The second fixed sleep cycle may also be selected for constant periodic background traffic (e.g., instant messaging (IM) updates or email). The third fixed sleep cycle may be selected for delay-tolerant traffic (e.g., on periods of file-transfer protocol (FTP) and hyper-text transfer protocol (HTTP) traffic). The first binary exponential sleep cycle may be selected for on-periods of delay-tolerant traffic (e.g., on periods of FTP and HTTP traffic). The first binary exponential sleep cycle may be selected for off-periods of delay-tolerant traffic (e.g., off-periods of FTP and HTTP traffic).

In these embodiments, the mobile station 106 may observe and evaluate the current traffic to identify the type of traffic to determine which of the predetermined sleep cycles to select. Since more than one of the predefined sleep cycles may be applicable to the same type of traffic, the mobile station 106 may also base its selection of a predefined sleep cycle on other factors, such as channel conditions and power availability, to optimize power consumption reduction. For example, for FTP and HTTP traffic. The mobile station 106 may choose the third fixed sleep cycle to constrain the delay value to a certain limit, which is applicable not just for HTTP, FTP type of traffic, but also for other applications such as gaming. The mobile station 106 may choose the first binary exponential sleep cycle, when a varied delay is more acceptable. The acceptability of delay may depend upon, for example, whether a video streaming application is being transmitted using a HTTP.

In some embodiments, the processing circuitry 212 is configured to observe and evaluate the downlink traffic 107 during AIs of the current sleep pattern over a predetermined number of frames and determine whether or not to change the current sleep cycle after the predetermined number of frames. The predetermined number of frames may range from three to ten frames and may depend on the current sleep cycle. In these embodiments, the mobile station 106 may include a timer that may be set to expire after the predetermined number of frames during which traffic activity is monitored during the AIs. For example, when the base station 102 and the mobile station 104 are using the first fixed sleep cycle with a shorter AI and a longer UAI, and if no traffic activity is detected during the AIs over the predetermined number of frames, upon the expiration of the timer, the mobile station 106 may request that the sleep cycle be changed to the second fixed sleep cycle with a shorter AI and a longer UAI.

Table II illustrates an example format of the dynamic sleep-cycle switching message 105.

TABLE II

Dynamic Sleep-Cycle Switching Message Format

| Description | Number of bits | Operation |
|---|---|---|
| Indication to change currently active PSC parameters | 1-bit | 0-to change PSC parameters to one of the predefined sleep cycles<br>1-to change PSC parameters to parameters defined in this message |
| For inclusion when the PSC parameters are changed to one of the predefined sleep cycles | 7-bits | 3-bits to indicate one of the predefined sleep cycles<br>4-bits to indicate the start sleep frame offset |
| For inclusion when the PSC parameters are changed to parameters defined in this message | 4-bytes | 1-bit to indicate whether the sleep cycle is fixed or binary exponential<br>8-bits to indicate the initial sleep window<br>8-bits to indicate the listen window<br>10-bits to indicate the final sleep window base<br>3-bits to indicate the final sleep window exponent |

In some embodiments, the base station 102 may monitor downlink traffic to the mobile station 106 and may send a dynamic sleep-cycle switching message to the mobile station 106 during an AI with the last downlink data message. In some embodiments, the mobile station 106 may monitor downlink traffic from the base station 102 may send the dynamic sleep-cycle switching message 105 to the base station 102 during an AI with the last uplink data message. The dynamic sleep-cycle switching message 105 may be sent as either a sub-header or an extended header message. Alternatively, the dynamic sleep-cycle switching message 105 may be sent as a stand-alone MAC management message.

Figure 3:
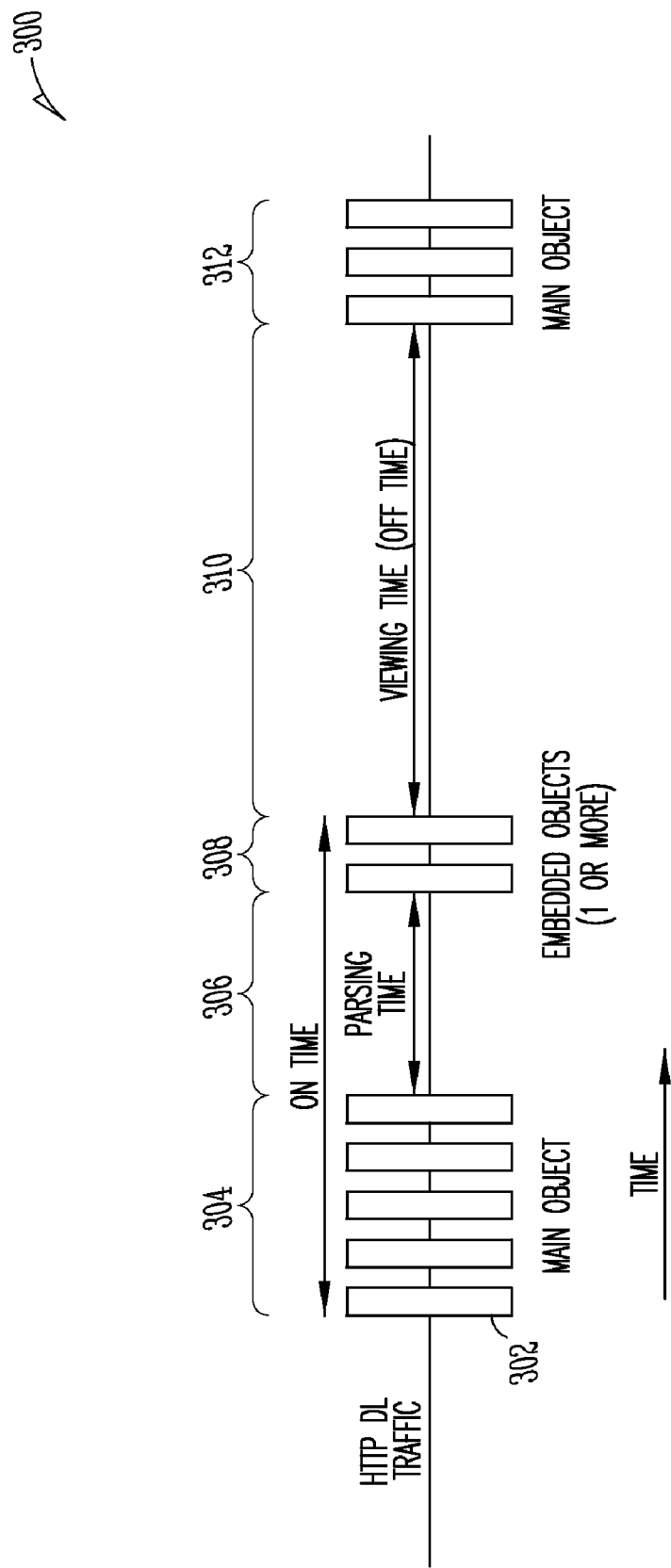
FIG. 3 illustrates an example downlink traffic pattern in accordance with some embodiments.

FIG. 3 illustrates an example downlink traffic pattern in accordance with some embodiments. Downlink traffic pattern 300 may represent downlink traffic that may be sent from base station 102 (FIG. 1) to a mobile station, such as the mobile station 106 (FIG. 1). Downlink traffic pattern 300 may represent an example of HTTP downlink (DL) traffic and may include a plurality of frames 302. Downlink traffic pattern 300 may include time 304 during which frames of a main object are received, and parsing time 306 during which no frames are received and the main object is parsed. Downlink traffic pattern 300 may also include time 308 during which frames of one or more embedded are received, and viewing time 310 during which no frames 302 are received. Downlink traffic pattern 300 may also include time 312 during which frames of another main object may be received. A sleep cycle of a conventional mobile station may have on-time periods that include times 304, 306 and 308 and off-time periods that include viewing time 310.

The typical time duration of the on-time periods is very short and random (in the range of a few hundred milliseconds to 1 second) compared to the length of the off-time periods which can be very long (anywhere from a few seconds to 30 or 40 seconds). During the on-time periods, a fixed sleep cycle pattern of short listen and sleep windows may be used enable good application download performance and enable power savings. However, during the off-time periods, this sleep cycle may result in sub-optimal performance since the mobile station would wake up too often and for too long to receive no traffic. A sleep cycle pattern of exponentially increasing large sleep windows may be more optimal in this situation.

Since the duration of on-time periods is not very long, it would be desirable that as soon as the mobile station is detected to be in an on-time period (within a few tens of milliseconds), it initiates a change in sleep cycle. Conventionally, a change in the sleep cycle takes place over a period of several frames (taking anywhere from 20-40 frames where each frame lasts up to 5 ms). This amount of time is too long to achieve any significant power-savings gain. Conventionally, during this time period, the mobile station de-activates its current PSC and reactivates a different PSC and then waits for the new PSC to begin.

In accordance with embodiments, the mobile station 106 is configured to dynamically switch sleep cycles without deactivating a current power savings class (PSC). The mobile station 106 may generate the dynamic sleep-cycle switching message 105 to request a change in a sleep cycle of the mobile station 106 when changes in downlink traffic are detected. The dynamic sleep-cycle switching message 105 may indicate either one of a plurality of predefined sleep cycles or may indicate parameters defining a new sleep cycle. In this way, the current sleep cycle may be changed without deactivating the currently active PSC allowing the sleep patter to be quickly changed.

Figure 4:
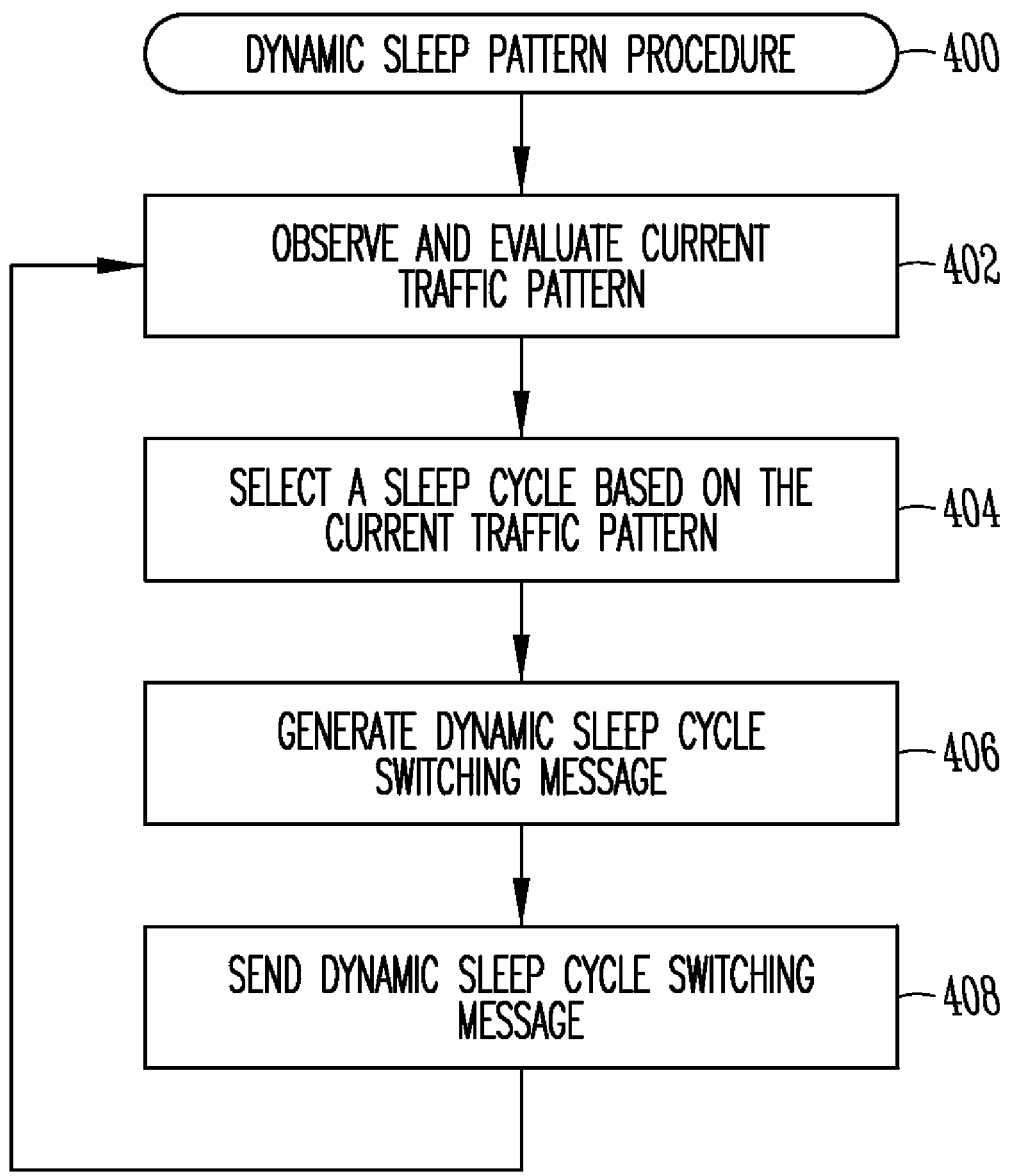
FIG. 4 is a dynamic sleep pattern procedure in accordance with some embodiments.

FIG. 4 is a dynamic sleep pattern procedure in accordance with some embodiments. Dynamic sleep pattern procedure 400 may be performed by any one or more of mobile stations 104 (FIG. 1) such as the mobile station 106 (FIG. 1).

Operation 402 comprises observing and evaluating a current traffic pattern. In some embodiments, operation 402 includes observing downlink traffic 107 (FIG. 1) to detect changes in the traffic pattern.

Operation 404 comprises selecting a sleep cycle based on the current traffic pattern when changes in the current traffic pattern are observed. In some embodiments, one of a plurality of predefined sleep cycles may be selected, or parameters defining a new sleep cycle may be determined.

Operation 406 comprises generating a dynamic sleep-cycle switching message to indicate the sleep cycle selected in operation 404. The dynamic sleep-cycle switching message may correspond to dynamic sleep-cycle switching message 105 (FIG. 1) and may indicating either one of the predefined sleep cycles or may indicate the parameters defining a new sleep cycle as discussed above.

Operation 408 comprises sending the dynamic sleep-cycle switching message to a base station. The dynamic sleep-cycle switching message may be configured to change the sleep cycle of a currently active PSC without deactivating the currently active PSC.

Although the mobile station 106 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the mobile station 106 may refer to one or more processes operating on one or more processing elements.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A mobile station comprising processing circuitry to generate a dynamic sleep-cycle switching message to request a change in a sleep cycle of the mobile station when changes in downlink traffic are detected, the dynamic sleep-cycle switching message indicating either one of a plurality of predefined sleep cycles or indicating parameters defining a new sleep cycle, wherein in response to detection of the changes in the downlink traffic, the dynamic sleep-cycle switching message is configured to change the sleep cycle of a currently active power saving class (PSC) without deactivating the currently active PSC, and wherein the currently active PSC is one of a plurality of predefined power saving classes that define a connection with a serving base station of a WiMAX network.

2. The mobile station of claim 1 wherein the processing circuitry is further configured to:

determine when a particular service class is active; and generate the dynamic sleep-cycle switching message to request a change in the sleep cycle based on the active service class.

3. A mobile station comprising:

processing circuitry to generate a dynamic sleep-cycle switching message to request a change in a sleep cycle of the mobile station when changes in downlink traffic are detected, the dynamic sleep-cycle switching message indicating either one of a plurality of predefined sleep cycles or indicating parameters defining a new sleep cycle, wherein the processing circuitry is configured to observe and evaluate the downlink traffic to detect the changes in the downlink traffic, and wherein the processing circuitry is configured to select either one of the predefined sleep cycles or the parameters defining the new sleep cycle based on detected changes in the downlink traffic.

4. The mobile station of claim 3 wherein in response to detection of the changes in the downlink traffic, the dynamic sleep-cycle switching message is configured to change the sleep cycle of a currently active power saving class (PSC) without deactivating the currently active PSC, and wherein changing the sleep cycle comprises changing parameters of the currently active PSC.

5. The mobile station of claim 4 wherein changing the sleep cycle of the currently active PSC comprises changing a length of availability intervals (AIs) and unavailability intervals (UAIs) of the sleep cycle of the currently active PSC.

6. The mobile station of claim 4 wherein in response to detection of changes in the downlink traffic, the processing circuitry is further configured to:

refrain from sending a request message to a serving base station to deactivate the currently active PSC in response to changes detected in the downlink traffic; and refrain from sending another request message to the serving base station to activate a different PSC.

7. The mobile station of claim 4 wherein the dynamic sleep-cycle switching message comprises an identifier having a predetermined number of bits indicating one of the predefined sleep cycles.

8. The mobile station of claim 7 wherein a sleep cycle comprises one or more availability intervals (AI) interleaved with one or more unavailability intervals (UAI), and wherein the predefined sleep cycles comprise:

a first fixed sleep cycle with a shorter AI and a shorter UAI;

a second fixed sleep cycle with a shorter AI and a longer UAI;

a third fixed sleep cycle with a longer AI and a longer UAI;

a first binary exponential sleep cycle with a shorter AI, a shorter UAI and a shorter final UAI; and a second binary exponential sleep cycle with a shorter AI, a longer UAI and a longer final UAI.

9. The mobile station of claim 8 wherein the first fixed sleep cycle is selected during talk periods of VoIP traffic, and wherein the second fixed sleep cycle is selected during mutual silence periods of the VoIP traffic.

10. The mobile station of claim 9 wherein the second fixed sleep cycle is selected for constant periodic background traffic;

wherein the third fixed sleep cycle is selected for delay-tolerant traffic;

wherein the first binary exponential sleep cycle is selected for on-periods of delay-tolerant traffic; and wherein the first binary exponential sleep cycle is selected for off-periods of delay-tolerant traffic.

11. The mobile station of claim 4 wherein the processing circuitry is configured to observe and evaluate the downlink traffic during availability intervals of a current sleep pattern over a predetermined number of frames and determine whether or not to change the current sleep cycle after the predetermined number of frames.

12. The mobile station of claim 11 wherein both the mobile station and the base station are configured to:

observe the downlink traffic during the predetermined number of frames; and change the sleep cycle to one of the predefined sleep cycles without the use of the dynamic sleep-cycle switching message based on the observed downlink traffic.

13. The mobile station of claim 11 wherein the mobile station is configured to operate in a WiMAX network operating in accordance one of the IEEE 802.16 standards or proposed standards, wherein the frames are WiMAX downlink subframes, and wherein the mobile station and the base station communicate the downlink subframes and uplink subframes using an orthogonal frequency division multiple access (OFDMA) communication technique.

14. A method performed by a mobile station comprising:

observing downlink traffic to detect changes in a traffic pattern; and sending a dynamic sleep-cycle switching message to request a change in a sleep cycle of the mobile station in response to detected changes, the dynamic sleep-cycle switching message indicating either one of a plurality of predefined sleep cycles or indicating parameters defining a new sleep cycle, wherein the dynamic sleep-cycle switching message is configured to change the sleep cycle of a currently active power saving class (PSC) without deactivating the currently active PSC, and wherein the currently active PSC is one of a plurality of predefined power saving classes that define a connection with a serving base station of a WiMAX network.

15. The method of claim 14 further comprising selecting one of the predefined sleep cycles based on the detected changes in the downlink traffic.

16. The method of claim 15 wherein the sleep cycle of the currently active PSC is changed by changing a length of availability intervals (AIs) and unavailability intervals (UAIs) of the sleep cycle of the currently active PSC.

17. A method performed by a mobile station comprising:

observing downlink traffic to detect changes in a traffic pattern; and sending a dynamic sleep-cycle switching message to request a change in a sleep cycle of the mobile station in response to detected changes, the dynamic sleep-cycle switching message indicating either one of a plurality of predefined sleep cycles or indicating parameters defining a new sleep cycle, wherein the dynamic sleep-cycle switching message is configured to change the sleep cycle of a currently active power saving class (PSC) without deactivating the currently active PSC
wherein the method further comprises:
refraining from sending a request message to a serving base station to deactivate the currently active PSC in response to changes detected in the downlink traffic; and
refraining from sending another request message to the serving base station to activate a different PSC.

18. A mobile station comprising:
processing circuitry configured to reduce power consumption by responding to changes in downlink traffic by: causing the mobile station to send a dynamic sleep-cycle switching message to request a change of a sleep cycle of a currently active power saving class (PSC) without deactivating the currently active PSC, wherein the sleep cycle is changed by changing a length of availability intervals (AIs) and unavailability intervals (UAIs) of the sleep cycle of the currently active PSC, and wherein the dynamic sleep-cycle switching message indicates either one of a plurality of predefined sleep cycles or indicates parameters defining a new sleep cycle.

19. The mobile station of claim 18 further configured to:
observe the downlink traffic to detect changes in a traffic pattern; and send the dynamic sleep-cycle switching message to request the change in the sleep cycle of the mobile station in response to the detected.

* * * * *

UNITED STATES PATENT AND TRADEMARK OFFICE
CERTIFICATE OF CORRECTION

| | | |
|---|---|---|
| PATENT NO. | : 8,233,418 B2 | Page 1 of 1 |
| APPLICATION NO. | : 12/497196 | |
| DATED | : July 31, 2012 | |
| INVENTOR(S) | : Maruti Gupta | |

It is certified that error appears in the above-identified patent and that said Letters Patent is hereby corrected as shown below:

In column 10, line 29, in claim 13, after "accordance", insert --with--, therefor In column 11, line 4, in claim 17, after "PSC", insert --,--, therefor In column 12, line 13, in claim 19, after "detected", insert --changes--, therefor Signed and Sealed this
Fourth Day of December, 2012

David J. Kappos
*Director of the United States Patent and Trademark Office*